Sept. 8, 1953
A. P. SAUER
2,651,488
ROTATABLY ADJUSTABLE MOUNT FOR MOTORCYCLE
HEADLIGHTS AND THE LIKE
Filed April 27, 1950
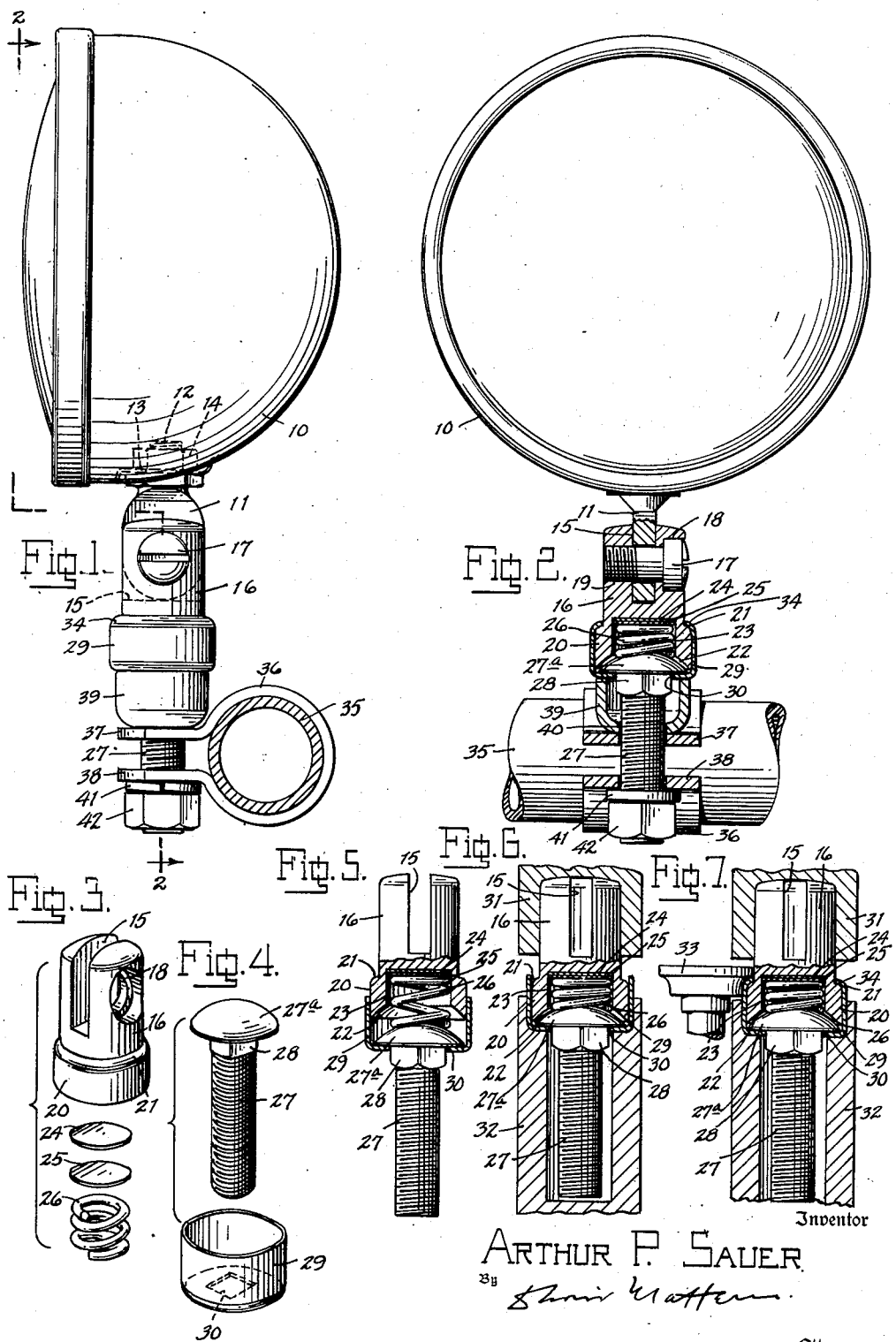
Inventor
ARTHUR P. SAUER
By
Attorney Patented Sept. 8, 1953

2,651,488

UNITED STATES PATENT OFFICE 2,651,488

ROTATABLY ADJUSTABLE MOUNT FOR MOTORCYCLE HEADLIGHTS AND THE LIKE

Arthur P. Sauer, Fairfield, Conn., assignor to The Kilborn-Sauer Company, Fairfield, Conn., a corporation of Connecticut Application April 27, 1950, Serial No. 158,543

3 Claims. (Cl. 248—289)

The present invention relates to a rotatably adjustable mount for motorcycle headlights and the like, and has for an object to provide a device of this character by means of which the directional position of the headlight may be adjusted by rotation about a vertical axis, and which adjustment will not be disturbed by ordinary pressures applied to the headlight, or by the extreme vibration to which such headlights are subjected in their use upon a motorcycle or similar structure. It is particularly proposed to provide a mounting which may be rotatably adjusted by exerting a firm turning force upon the headlight, as distinguished from dirigible searchlights which are adapted to be directionally turned with relative ease, the position of adjustment usually remaining fixed after initial installation of the headlight upon the handle bar of the motorcycle or the like. Heretofore, devices of this character have employed set screws, bolts, locknuts and similar devices for fixing the position of adjustment, but these were apt to become loose, required tools to affect the adjustment, and did not lend themselves to the production of an attractive, smooth, streamlined design. It is particularly proposed in the present invention to provide a spring loaded mounting having a relatively high degree of spring pressure for providing a high degree of resistance to turning, and further to provide a permanent assembly in which the compressed spring is entirely enclosed and protected, so that its initial high pressure setting will be permanently maintained.

With the above and other objects in view, an embodiment of the invention is shown in the accompanying drawing, and this embodiment will be hereinafter more fully described with reference thereto, and the invention will be finally pointed out in the claims.

In the drawings:

Fig. 1 is a side elevation of a motorcycle headlight showing the mount according to the illustrated exemplary embodiment of the invention, the same being shown clamped to the handle bar of the motorcycle.

Fig. 2 is a view partly in front elevation, and partly in vertical section along the line 2—2 of Fig. 1.

Fig. 3 is a perspective view showing certain parts of the mount in separated relation.

Fig. 4 is a perspective view showing certain other parts of the mount in separated relation.

Fig. 5 is a vertical sectional view showing the first step in the assembling of the parts.

Fig. 6 is a similar view showing the parts forced by a press into assembled relation and prior to their being permanently secured together.

Fig. 7 is a similar view showing the parts permanently secured together by a spinning operation or the like, while still under the assembling pressure of the press.

Similar reference characters indicate corresponding parts throughout the several figures of the drawings.

Referring to the drawings the headlight and the mount therefor, according to the illustrated exemplary embodiment of the invention, comprises a conventional type of lamp unit including a casing 10 in which the usual lamp bulb, reflector and lens are mounted, these preferably being in the form of a sealed beam reflector type unit. The casing is provided at its lower side with a downwardly projecting apertured lug member 11, rigidly connected thereto, as by a threaded stud 12 engaged upwardly through an apertured bearing portion 13 of the casing and secured by an interiorly disposed nut 4.

The apertured lug member is pivotally engaged for adjustment about a horizontal axis in the slot 15 of a post member 16, provided with a transversely disposed bolt 17, having its shouldered head engaged in a shouldered hole 18 at one side of the slot, and its screw-threaded end engaged in a threaded hole 19 at the other side of the slot, tightening of the bolt adapted through binding action of the two sides of the post member to fix the tilted position of the lamp.

The post member 16 is provided at its lower end with an enlarged diameter cylindrical base portion 20 provided at its upper edge with a rounded annular shoulder 21 and provided in its underside with an annular spherical recess 22 and an axially disposed cylindrical pocket 23 extending upwardly therefrom. Within the pocket 23 there is engaged a pair of circular bearing disks 24 and 25 formed of steel or other suitable wear-resisting material, the disk 24 engaging the upper end of the pocket and being pressed against the same by the upper end of the helical compression spring 26 disposed in compressed relation within the pocket, as will hereinafter more fully appear. It is pointed out that the spring which is under relatively high compression has its upper end in bearing relation with the lower disk 25 so that the upper end wall of the pocket is protected against direct contact with the end of the spring, which would tend under its high pressure to cut into the metal of the post and impair the functioning of the mount, the post being preferably constructed of brass or other relatively soft material which would not in itself provide a suitable rotatable bearing surface for the high pressure spring. The bearing disk 24 being in contact with the upper end of the pocket will be resisted in its turning movement through frictional engagement with the softer metal of the post, so that when the post is rotatably adjusted about its vertical axis, the contacting surface of the bearing disks turn upon each other, the disk 25 tending to remain fixed with respect to the end of the spring through frictional engagement of the latter therewith.

The lower end of the spring is seated upon the spherically rounded head 27a of a vertically disposed bolt 27 of the conventional stove-bolt type having a square neck portion 28 beneath the head. Its rounded head is preferably of corresponding radius to the annular spherical recess 22 of the post member. A cup shaped collar member 29 provided in its base with a square hole 30 is engaged with the bolt, with the square neck portion 28 of the bolt non-rotatably fitted in the square hole and with the underside of the bolt head resting upon the inner side of the base of the collar member. The cylindrical wall of the collar member is engaged with a slide fit upon the base portion 20 of the post member, and prior to assembly is of such height that it extends slightly above the annular shoulder 21, as shown clearly in Fig. 6.

In assembling the mount the parts are first assembled as shown in Fig. 5 with the spring in its expanded state. The spring 26 is of relatively heavy gauge and of such high resistance that it could not practically be compressed by manual effort, and therefore the assembly is carried out in a suitable press comprising a press part 31 in which the post member 16 is engaged and a press part 32 in which the collar member 29 is engaged, the press being brought together by suitable power means to compress the spring as shown in Fig. 6, and to bring the upper edge of the side wall of the collar slightly above the annular shoulder 21. While the press maintains the parts in this compressed relation a suitable spinning operation is carried out by means of a spinning tool 33, as shown in Fig. 7, which spins the upper edge portion of the collar inwardly upon the shoulder 21, as at 34, thus permanently holding the parts in their compressed assembled relation so that the compressed spring is permanently enclosed and protected.

The amount comprising the several parts shown in Figs. 3 and 4 may be employed for various purposes for providing rotatable adjustment. In the particular headlight use, illustrated by way of an example, the mount is adapted to be connected to the handle bar 35 of the motorcycle or the like by means of a clamp 36 engaged about the handle bar, having apertured ears 37 and 38 through which the bolt 27 is engaged, a cup-shaped spacing member 39 having an aperture 40 in its base being engaged about the bolt between the ear 37 and the underside of the collar member 29 and enclosing the upper end of the bolt. Upon the lower end of the bolt there is engaged a lock washer 41, engaged with the lower ear 38, and a nut 42 which upon being tightened rigidly fixes the bolt and the collar 29 with respect to the tightened clamp 36. In order to directionally adjust the lamp about the vertical axis of the mount, the lamp casing is gripped by the hands to provide suitable leverage, and turned to cause the post 16 to rotate against the frictional resistance set up between the bearing disks 24 and 25 by the compressed spring. While a smooth turning action is thus provided when sufficient force is applied, the frictional resistance is such that ordinary pressures upon the lamp will not disturb its position, and more particularly the intense vibration set up by the operation of the motorcycle will not tend to change the position of adjustment.

I have illustrated and described a preferred and satisfactory embodiment of the invention, but it will be understood that changes may be made therein within the spirit and scope thereof, as defined in the appended claims.

What is claimed is:

1. A rotatably adjustable mount, comprising a post member having a transversely enlarged base portion having an external cylindrical surface concentric to its axis and extending a substantial distance upwardly from its lower end, an annular shoulder extending inwardly from the upper end of said cylindrical surface, there being an axially disposed cylindrical pocket extending upwardly within said base portion from the lower end of said post member and having a closed upper end, a bolt member coaxially beneath said pocket having a laterally projecting head provided with a flat annular under surface and a non-circular portion adjacent to and beneath said head, a helical spring within said pocket engaged with the upper side of said bolt head and compressed between said bolt head and said upper end of said pocket, and a cup-shaped cylindrical collar member having a flat base engaged with the flat under side of said bolt head and provided with a central non-circular aperture non-rotatably engaged by said non-circular portion of said bolt member, the cylindrical wall of said collar member being rotatably engaged with said cylindrical surface of said base portion of said post member to maintain said collar member in coaxial relation with said post member, and an inwardly extending annular retaining portion at the upper end of said cylindrical wall of said collar member engaged over said annular shoulder to maintain said spring in compression.

2. The invention as defined in claim 1, further characterized by a pair of bearing disks inserted in said pocket in rotatable bearing contact with each other, one disk being engaged with upper end of said pocket and the other disk being engaged with the upper end of said spring.

3. The invention as defined in claim 1, further characterized in that said bolt head is of spherical rounded form at its upper side and said post is provided in its lower end with an annular spherical recess of substantially corresponding radius to the radius of said rounded head.

ARTHUR P. SAUER.

References Cited in the file of this patent

UNITED STATES PATENTS

| Number | Name | Date |
|---|---|---|
| 156,228 | Mathivet | Oct. 27, 1874 |
| 318,480 | Kendrick | May 26, 1885 |
| 374,447 | Botsford | Dec. 7, 1887 |
| 1,205,306 | Wood | Nov. 21, 1916 |
| 1,732,993 | Spiro | Oct. 22, 1929 |
| 1,927,703 | Glowacki | Sept. 19, 1933 |